United States Patent
Hawes, Jr. et al.

[15] 3,670,923
[45] June 20, 1972

[54] CONTROL SYSTEM FOR MULTIPLE INGREDIENT DISPENSING APPARATUS

[72] Inventors: Roland J. Hawes, Jr.; Milton P. Daniel, both of Boise, Idaho

[73] Assignee: said Hawes, by said Daniel

[22] Filed: May 4, 1970

[21] Appl. No.: 34,335

[52] U.S. Cl. ................................222/2, 222/142, 259/154
[51] Int. Cl. ............................................................B67d 5/14
[58] Field of Search..................222/142, 2, 52, 76, 132, 138; 119/51.13; 259/154

[56] References Cited

UNITED STATES PATENTS

| | | | |
|---|---|---|---|
| 2,800,152 | 7/1957 | Sloier | 222/142 X |
| 2,431,058 | 11/1947 | Manning | 222/2 X |
| 3,245,584 | 4/1966 | Linville | 222/132 X |

Primary Examiner—Stanley H. Tollberg
Attorney—Buckhorn, Blore, Klarquist & Sparkman

[57] ABSTRACT

A dispensing apparatus meters a plurality of different microingredient feed additive supplements for livestock or poultry simultaneously into a fluent carrier material which conveys the various supplements to a feedmill, a drinking water supply or any other desired point. Each different supplement is stored and metered separately and independently of the others through an electric motor-driven metering device. Control and monitoring of the machine operations takes place at a remote control panel and box. Decisions as to what combination of supplements to feed and in what amounts are preprogrammed using prepunched plates inserted over a bank of microswitch plungers at the control box which determine which motors at the machine operate and at what speed.

25 Claims, 9 Drawing Figures

PATENTED JUN 20 1972   3,670,923
SHEET 1 OF 3
FIG. 1
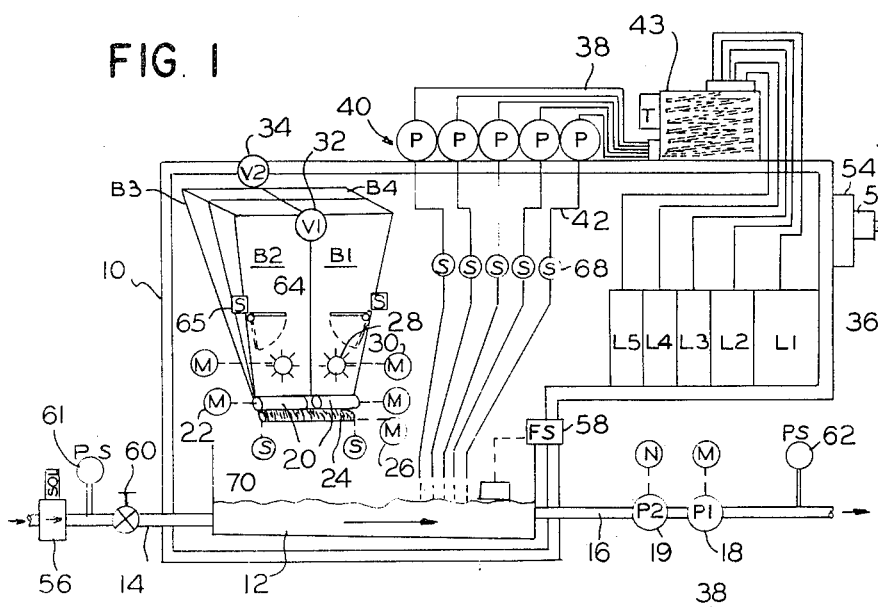
FIG. 2
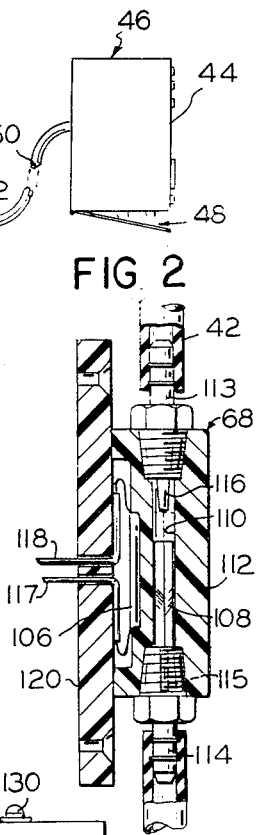
FIG. 3
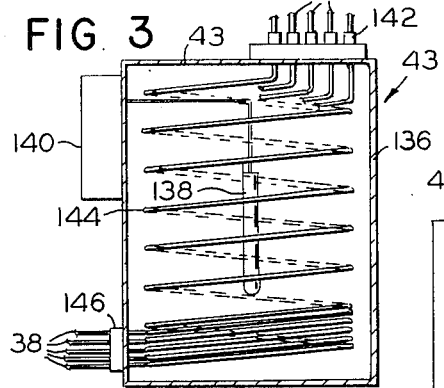
FIG. 4
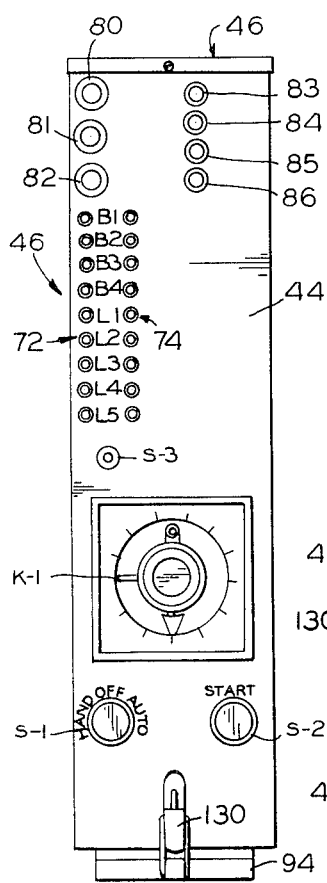
FIG. 7
FIG. 5
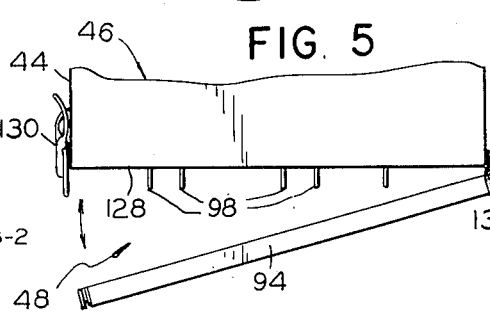
FIG. 6
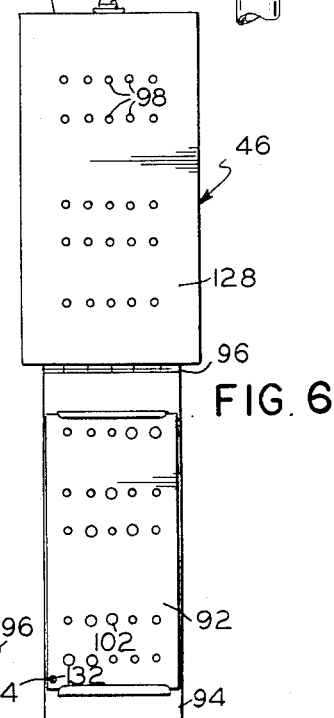
INVENTORS
ROLAND J. HAWES, JR.
MILTON P. DANIEL
BY
BUCKHORN, BLORE, KLARQUIST & SPARKMAN
ATTORNEYS

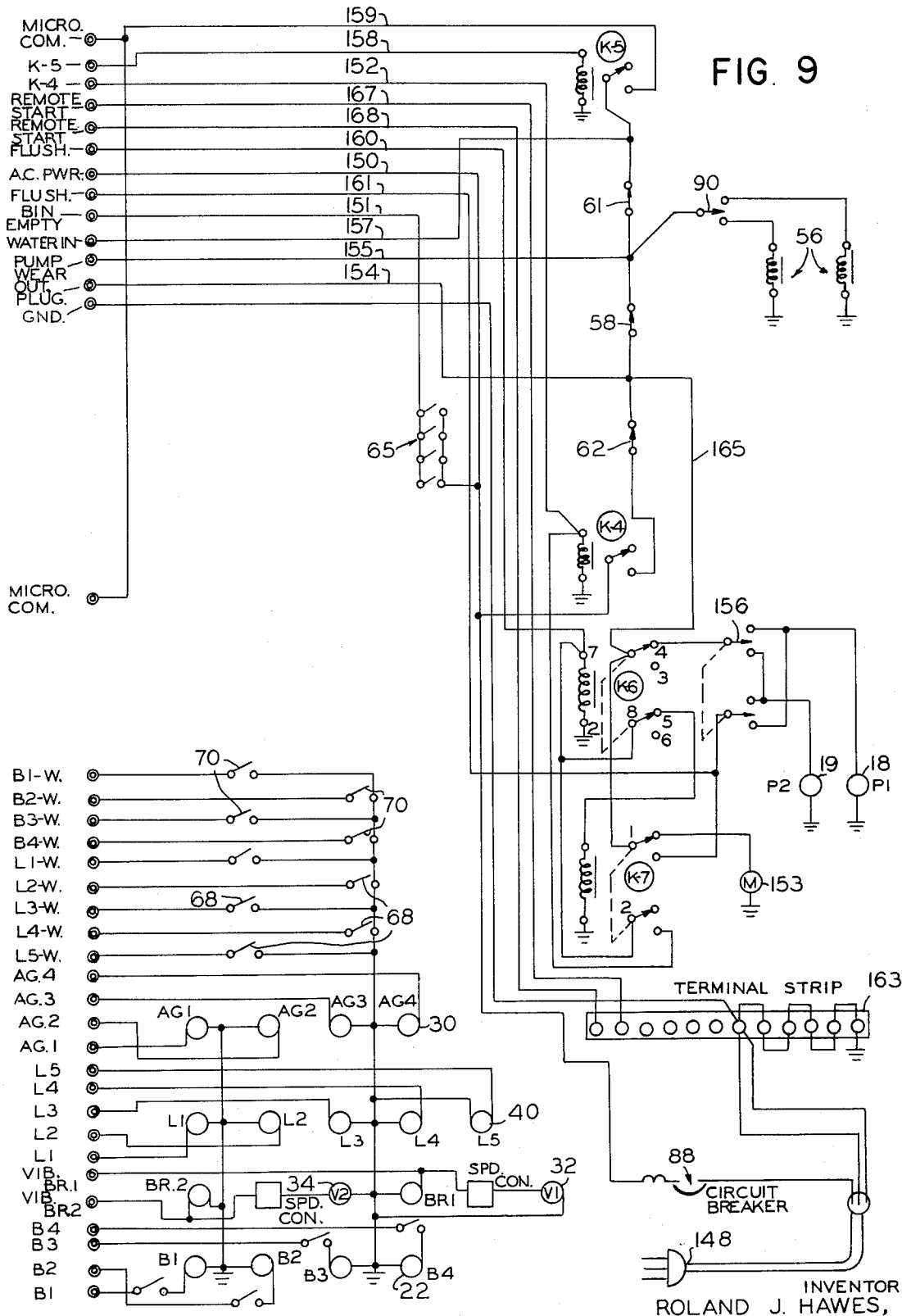

1

CONTROL SYSTEM FOR MULTIPLE INGREDIENT DISPENSING APPARATUS

BACKGROUND OF THE INVENTION

1. Field of the Invention

The present invention relates to machines for dispensing a plurality of dry or liquid microingredient feed additive supplements in concentrated form into the drinking water or feed ration of livestock or poultry, and more particularly to a control system for remotely controlling and monitoring the kinds and quantities of additives dispensed.

2. Description of the Prior Art

The present invention represents an improvement in the control systems of prior apparatus shown in one of the co-applicant's prior patents U.S. Pat. No. 3,437,075 issued Apr. 8, 1969, and U.S. Pat. No. 3,498,311 issued Mar. 3, 1970, wherein means are provided for storing separately and metering and dispensing separately but simultaneously two or more concentrated dry and liquid feed additive supplements into a fluent carrier material for delivery to a feedmill or drinking water station. Such prior machines have been highly successful for use by livestock feedlot operators. However, in practice it has been found that such prior machines cannot be readily maintained or programmed by the feedlot operator, without the help of highly trained technical personnel. Thus in the event of a malfunction, or the need for adjustment or for changing the kinds or quantities of supplements dispensed, much time is lost in waiting for the required technical personnel to arrive, or else inaccurate metering results from having untrained persons attempting to adjust the machine.

SUMMARY OF THE INVENTION

The foregoing considerations of the prior art has prompted an improvement in the control systems of the machines of the aforesaid prior patents rendering such machines relatively simple to monitor, operate, maintain and program by nontechnical personnel and from a remote control point a considerable distance from the machine itself. Furthermore the improved machine of the present invention enables complete remote operation of the machine and more accurate metering than prior machines, particularly with respect to liquid additive microingredients. Machines of the present invention are designed to meter very small quantities of highly concentrated microingredients. Therefore accuracy in metering is extremely important.

In one aspect of the invention, operation of the machine can be instituted and controlled at a remote control panel and control box.

In another aspect of the invention, the kinds and quantities of additives dispensed can be preprogrammed and easily changed simply by changing preprogrammed punched plates at the remote control box.

In another aspect of the invention, all of the machine's primary functions can be monitored from the remote control panel through the use of a system of indicator and wink lights. Such lights not only indicate which machine functions are operative or inoperative, but also which additives are being dispensed and at what rates.

In still another aspect of the invention, the viscosity of the various liquid additives are maintained at a substantially constant level just upstream from the metering pumps for such additives so that at a given pump speed setting, such pump will always meter additive at a relatively constant rate for a high level of metering accuracy.

The foregoing and other objects of the present invention will become more apparent from the following detailed description which proceeds with reference to the accompanying drawings wherein:

FIG. 1 is a schematic view of a dispensing apparatus in accordance with the invention;

FIG. 2 is a longitudinal sectional view through a liquid flow activated switch for use in monitoring the flow rate of a liquid additive being dispensed;

FIG. 3 is a somewhat schematic sectional view through the portion of the apparatus of FIG. 1 which controls the viscosity of the liquid additives dispensed;

FIGS. 4, 5 and 6 are front, partial side and bottom views respectively of a remote control box and its integral control panel and program panel used to control, monitor and program the various machine operations;

FIG. 7 is a cross-sectional view of one of the metering rods in FIG. 1 and the rod-actuated switch used in monitoring the operation of such rod;

FIG. 9 is a circuit diagram of the wiring at the machine.

DETAILED DESCRIPTION

General Assembly

Figure 8:
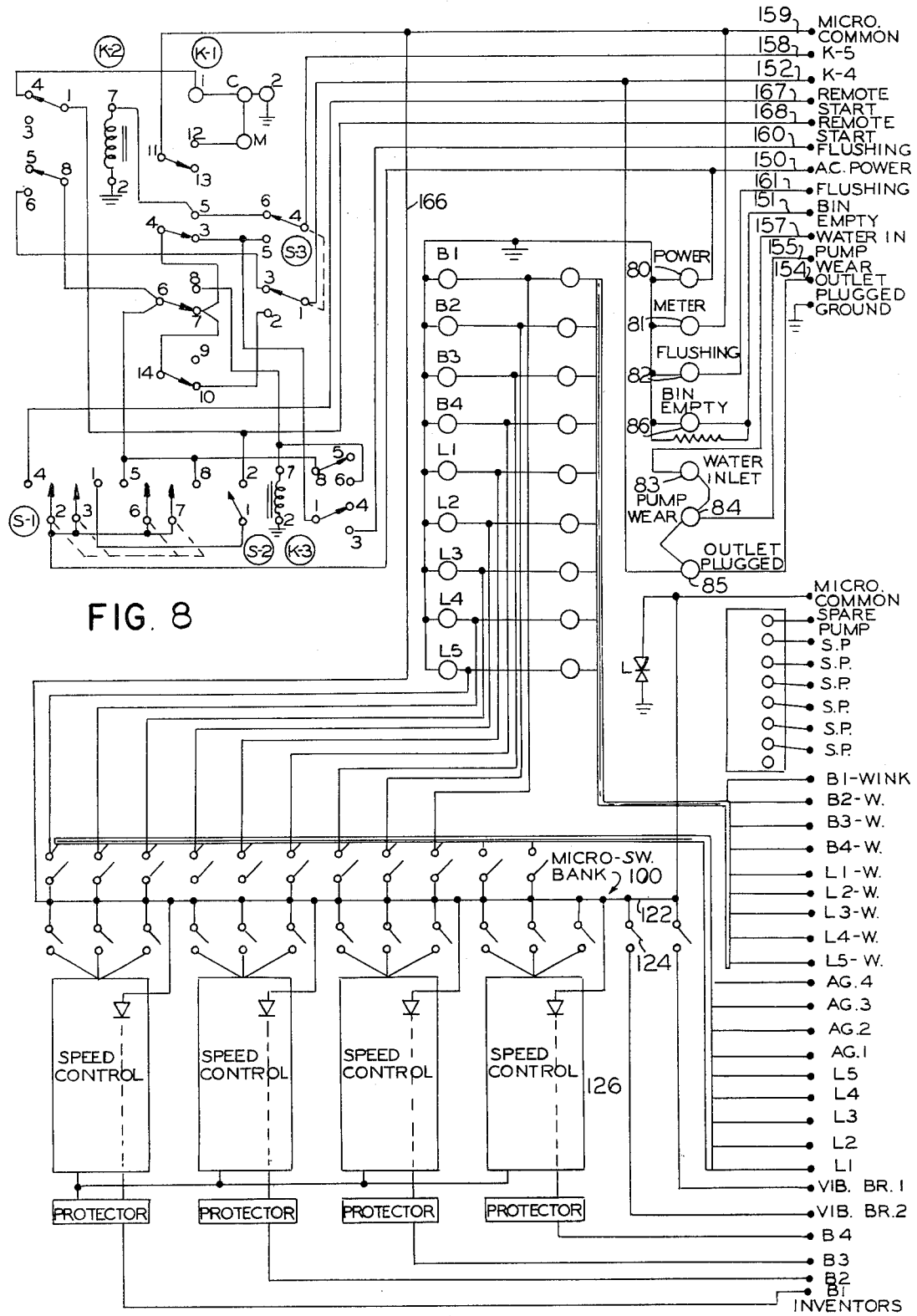
FIG. 8 is a circuit diagram of the remote control portion of the circuit used in controlling the machine functions.

The details of construction and arrangement of the mechanical components of the dispensing apparatus which the system of the present invention controls, operates and monitors is shown and described in the aforementioned prior U.S. Pats. No. 3,437,075 and 3,498,311, and reference is made to such patents for a more complete disclosure of such apparatus. Thus the structural details of the apparatus are shown only schematically in the present application, with reference to FIG. 1.

The machine includes a frame and housing 10 supporting a carrier-receiving trough or section 12 through which a liquid carrier such as water flows through an inlet pipe 14 from a remote pressurized source (not shown). The carrier liquid is discharged from the receiving section 12 through an outlet pipe 16 where it is pumped by one or both of two slurry pumps 18, 19 to a feedmill, watering station or feed station, or other remote point as desired.

Frame 10 also mounts a series of four bins B1, B2, B3, B4 for storing separately supplies of different dry microingredient feed additive supplements in concentrated form. These supplements may include vitamins, minerals, hormones, medicines or other pharmaceuticals as desired. Each bin has a bottom opening which is closed by a cylindrical metering rod 20, there being a different metering rod for each bin. Each rod has an opening or series of openings in its cylindrical surface and is rotated by a separate electric motor 22 capable of operating at different preselected speeds to vary the metering rate. Thus as each metering rod 20 rotates, its surface openings alternately pick up a predetermined quantity of dry ingredient from the bin and dump it into a flow of carrier material in the receiving tank 12. Since each different dry ingredient is stored in a different bin and each bin has its own metering rod independently driven by its own electric motor, the various dry ingredients can be metered and dispensed separately but simultaneously into the flow of carrier material within receiving tank 12 without intermixing with other supplements prior to entry into the carrier.

A brush 24 is mounted in conjunction with each pair of metering rods 20 and driven by an electric motor 26. The bristles of the brush sweep the additive-carrying openings of the metering rods after they have dumped most of the dry ingredient to ensure complete emptying of each rod opening before it returns to the bin opening for refilling. This feature ensures accurate dispensing at a predetermined rate.

Within each bin a paddle-type agitator device 28 rotates and is driven by another electric motor 30 to ensure that an adequate amount of dry material is available at the bin opening to fill the metering rod opening each time it revolves into registry with the bin opening.

Vibrator motors 32 and 34 are mounted on each pair of bins and operated during the metering cycle to prevent packing of the material and to ensure its flow downwardly in the bin toward the bottom opening.

The apparatus is also designed to dispense a plurality of different liquid feed additive supplements in concentrated form separately, simultaneously and accurately into the flow of carrier within receiving section 12. In the illustrated apparatus, a series of five separate liquid supply containers L1, L2, L3, L4 and L5 are mounted at or near the machine. Five separate liquid supply lines 38 lead from the various liquid supply tanks to the intake side of a series of five different liquid-metering pump and motor units 40.

Before the liquid intake lines 38 reach their respective pumps, such lines proceed in the form of metal coils through a constant temperature liquid within a viscosity control tank 43 so that the liquid additive entering each pump is always at a substantially constant viscosity. Thus for a given pump speed, the pump will always meter a given additive at a constant rate. Each liquid additive metering means includes a separate discharge line indicated generally at 42 through which each liquid additive is pumped into the flow of liquid carrier material in receiving section 12.

Various control devices are provided on the machine of FIG. 1. These are monitored through suitable electrical connections at a remote control panel 44 provided on a remote control box 46. The box also includes a programming device indicated generally at 48 for preprogramming the dispensing of preselected additives at predetermined rates. The various electrical connections between the machine and the remote control box 46 are made through a common cable connection 50, which may be of any required length and which includes a plug 52 which plugs into a socket 54 at the frame of the machine.

The various control devices at the machine itself include a solenoid-actuated water inlet valve 56 in inlet pipe 14. When two alternate inlet pipes are used, a separate inlet solenoid is used for each different pipe, as indicated in FIG. 9. Each inlet solenoid 56 is connected electrically with a float-actuated switch 58 which acts to close the solenoid valve 56 to stop the inflow of water to the receiving tank 12 whenever the level of carrier within tank 12 reaches an undesirably high level. Each inlet pipe 14 also includes a gate valve 60 to regulate the flow rate of liquid carrier into the receiving tank. This valve also creates a back pressure which is measured by a low pressure switch 61 in inlet pipe 14. Low pressure switch 61 is connected electrically with the various metering motors and operates in a manner so that no metering will occur until there is an adequate flow of carrier through section 12.

Outlet pipe 16 includes a high pressure switch 62 which operates in a manner to shut down the machine should the outlet pipe 16 becomes clogged, resulting in a build-up of high pressure in such pipe.

Each dry ingredient bin includes a low level indicator arm 64. This arm can be connected to operate in various ways to detect the level of material in a bin. In the illustration, the weight of material within the bin normally maintains the arm in a downward position. However, when the bin empties to a level below the arm, the arm swings upwardly to activate a switch 65 which illuminates a warning light on the remote control panel.

The discharge lines 42 for the various liquid additive metering pumps 40 include liquid-operated switch devices indicated generally at 68. These switches activate respective wink lights on control panel 44 when liquid pulses through the discharge lines under the pumping action of liquid additive pumps 40.

CONTROL PANEL

FIG. 4 shows the front face of control box 46, comprising remote control panel 44. Such panel includes three switches including a three-position function selector switch S1, a manual start push button switch S2 and a constant run two-position toggle switch S3. The control panel also includes the dial portion of a timer K1 for use in operating the machine for a predetermined period of time.

Above the switches and timer are two columns 72, 74 of nine small lights apiece, with each light in one column paired with a light in the other column. Each pair is designated B1, B2, B3, B4, L1, L2, L3, L4 and L5 corresponding to the various bins and liquid supply tanks. The lights in the left-hand column 72 are constantly illuminated when their respective metering motors are energized. The lights in the right-hand column 74 are wink lights which blink periodically during the actual dispensing of liquid or dry material. The liquid blink lights are activated by switches 68 triggered by the actual flow of liquid through discharge lines 42. The bin blink lights are activated by switches 70 (FIG. 1) triggered by the actual rotation of the metering rods.

MONITORING SYSTEM

Above the two columns of indicator and wink lights are seven larger indicator lights of different colors which illuminate to indicate various conditions and the operation of various functions at the machine.

The indicator light monitoring system keeps the operator completely informed of the operations being performed by the machine and the condition of certain machine components. Referring to the control panel of FIG. 4 and the control circuit diagram of FIGS. 8 and 9, when circuit breaker 88 in the machine is closed to supply power to the machine, a "power-on" light 80 on the control panel illuminates. When additive metering occurs through energization of one of the metering motors, a green "metering" light 81 illuminates. When a metering cycle ends, green light 81 goes out, and a white "flushing" light 82 illuminates, indicating that a flushing cycle is occurring. At the end of a timed flushing cycle, light 82 goes out, and the machine is conditioned for another complete operating cycle.

If insufficient water is delivered through inlet line 14 to operate the metering devices, or if an inlet solenoid valve switch 90 is turned off, a red "water inlet" light 83 on the control panel illuminates. If one of the slurry pumps 18 or 19 in the outlet line for any reason fails to clear receiving tank 12, the water level in the tank increases to open the float switch 58, causing a "pump wear" lamp 84 to illuminate. If the outlet line 16 should in some way become clogged, the "high pressure" switch 62 operates, causing an "outlet clogged" light 85 on the panel to illuminate. If one or more of the bins is nearly empty, a "bin empty" light 86 illuminates.

MONITORING OF LIQUID AND DRY MATERIAL

With reference to FIGS. 6, 8 and 9, whenever one of several interchangeable program plates 92 is placed within a plate-retaining gate 94 hinged at 96 to the bottom of the control box 46 and the gate closed against the bottom of the box, certain plungers 98 of a microswitch bank 100 within the control box are actuated by the program plate. The positions of certain punched holes 102 in plate 92 determine which microswitches will not be activated. The activated microswitches of the bank 100 energize predetermined liquid and dry metering motors at predetermined speeds. Actuation of these microswitches also energizes certain of the small lights in left-hand column 72 on the control panel corresponding to the dry and liquid materials being metered.

Whenever the control box is programmed for a dry additive to be metered from a certain bin, a light in the left-hand column on the control panel for that particular bin is illuminated continuously upon activation of the appropriate microswitch for that bin. At the same time, the wink light in the right-hand column of the control panel for the same bin winks constantly, at a rate also determined by the programming.

Power for the "bin-on" lights in the left-hand column 72 is taken from the agitator motor circuit for each respective bin, as is power for the respective "wink" lights for such bin. The opposite pole of the "bin-on" lights is grounded in normal fashion. The ground circuits for the "wink" lights in the right-hand column for each bin pass through the microswitches 70 mounted near ends of the metering rods.

As shown in FIG. 7, an end portion of each metering rod 20 has an annular groove 102 around approximately three-quarters of its circumference. An actuating arm 103 of microswitch 70 rides in this groove in the switch's "off" mode. As arm 103 rides on the ungrooved one-quarter periphery of the rod during rotation of the rod, the microswitch closes momentarily to complete the circuit to the corresponding wink light on the control panel. Thus such light winks once during each revolution of the rod, and the frequency of winking is determined by the speed of rotation of the rod. Winking of such light is an indication that the rod is actually turning.

Power for the "liquid on" lights in the left-hand column of the control panel is taken from the liquid pump motor circuit for each respective pump, as is power for the respective pump wink lights. The opposite poles of the "liquid on" lights are grounded in the usual fashion. The ground circuits for the liquid wink lights pass through magnetically actuated reed switches 68, one of which is shown in detail in FIG. 2. The magnets for these switches are moved under the influence of liquid flow, thereby giving a positive indication of liquid metering.

Referring to FIG. 2, each liquid wink light switch assembly includes a magnetically actuated reed switch 106 and an elongate bar magnet 108. Each switch assembly 68 is in one of the discharge lines 42 leading from a liquid additive metering pump 40. The major length of each line 42 may comprise, for example, a length of flexible plastic tubing. However, the portion of line 42 within which magnet 108 resides is a bore 110 drilled through a block 112. Metal hose connection nipples 113 and 114 are cemented to the upper and lower ends of block 112 to provide quick connection and disconnection of the plastic portions of the line 42 to the switch block.

Bore 110 is constricted at its opposite ends by inserting short sections of smaller diameter plastic tubing within the opposite ends of such bore as at 115 and 116, to limit movement of the magnet 108. Bore 110 is of circular cross section whereas magnet 108 is of square cross section and of slightly smaller overall width than the diameter of the bore and a slightly larger overall width than the diameter of the constricted opposite ends of the bore. Thus liquid pumped through line 42 flows through the bore 110 and around the magnet without being impeded appreciably.

Reed switch 106 is housed within a hollowed-out portion of the plastic block 112 alongside bore 110. The electrical leads 117, 118 of the switch pass out of the block through small holes drilled through a rectangular backing plate 120 which is cemented to the back of block 112 to seal reed switch 106 within the block. The block is preferably made of transparent or translucent plastic so that operation of the magnet can be observed.

In operation, block 112 is mounted in a vertical position, with tubing 42 connected to an additive-metering pump. The magnet assembly is adjusted to the proper position for positive operation of the reed switch in a manner so that each pulse of the pump raises the magnet into position to close the reed switch. Between pulses, the magnet drops by gravity in bore 110 allowing the reed switch to return to its normally open position. The associated wink light on the control panel is grounded by each closing of the switch, causing such light to wink with each stroke of the metering pump. In practice positive wink light operation with liquid additives common to this type of apparatus has been achieved within a range of from four to 100 winks per minute while allowing flows of from 2 to 250 cubic centimeters per minute.

PUNCH PLATE PROGRAMMING SYSTEM

As previously indicated, the programming system is located in control box 46 and includes a bank of 25 microswitches 100 arranged in a flat platen. As will be apparent from FIG. 8, the common terminals of all such switches are connected together electrically, and power is supplied to this common "bus" 122 via a relay K-5 shown in FIG. 9 at the machine. The normally open pole 124 of each microswitch when closed is connected electrically to a predetermined metering motor, brush motor, agitator motor, liquid pump metering motor or one of four speed controls 126. Each speed control determines one of three preselected speeds for each of the metering rod motors 22.

The bottom 128 of control box 46 includes the program plate retaining gate 94 hinged at 96 directly below microswitch plungers 98. The gate is closed using a lever-type lock 130, shown best in FIGS. 4 and 5, in a manner so that the program plate 92 applies actuating pressure to all plungers 98 except those aligned with punched-out portions of the plate. Program plate 92 is made of a rigid material such as sheet aluminum, fiberglass or the like. Such plate is made to fit closely inside the gate. A pilot hole 132 in each plate matches a pin 134 in the gate to prevent improper insertion of the program plate. By closing the gate against the bottom of the control box, the plate presses against the microswitch plungers, causing the switches to be closed. Each microswitch plunger thus pressed completes a circuit to a motor or speed control to cause a predetermined preprogrammed motor to operate.

Each interchangeable program plate 92 is either predrilled or prepunched to match the position of one of the microswitch plungers 98. To preprogram the machine, certain of the preformed holes are enlarged to an extent so that a microswitch plunger will pass through the hole so that the plate cannot actuate such switch. The 25 microswitches shown in the control circuit of FIG. 8 supply ample program combinations to accomplish the purposes for which the illustrated machine was designed.

VISCOSITY CONTROL

As previously mentioned, the apparatus includes a viscosity control device 43 to ensure that the viscosity of the various liquid additives will not affect their metering rate. The viscosity control is shown most clearly in FIG. 3 and includes a pot 136 filled with antifreeze, oil or other non-evaporative liquid and having a heating element 138 disposed centrally within the pot to heat the liquid. The heating element is connected to a thermostat control 140 which acts to maintain the water within the pot at a constant temperature. The five liquid intake lines 38 just upstream from the liquid-metering pumps 40 are connected respectively to five inlet nipples 142 at the upper circumference of the pot. These nipples lead to five separate metal conduit coils 144 which wind downwardly through the water in the pot surrounding the heating element 138 to five separate outlet nipples 146 near the bottom of the pot. Continuations of flexible pump intake lines 38 are connected to these outlet nipples. By the time each liquid additive flows through its respective coil to the bottom of the pot, the liquid within the pot transmitting heat through the metal coil heats the additive to a uniform temperature before it is drawn into the metering pump, thereby ensuring that liquid additive always enters the pump at a uniform viscosity.

OPERATION OF CONTROL SYSTEM

Power is supplied to the machine via power cord 148. All power to the machine passes through circuit breaker 88 in the machine. Upon closing of the circuit breaker, power is applied to the common poles of switch S1 in the control box via conductor 150, to the power "on" light 80 on the control panel, to the common terminal of relay K-4 in the machine, and to the bin warning switches 65. Thus under this condition the power-on light should be illuminated, and so should the bin warning light if any dry bin is empty or near empty. Bin warning light 86 receives power through conductor 151.

If panel selector switch S1 is turned to its "HAND" position, a start may be initiated only by momentarily depressing "START" button S2. Before a start is initiated, a timer relay K-1 in the control box is in a timed-out condition, with its contacts in the position shown in FIG. 8. With start push button S2 depressed, common poles 11, 4, 6 and 14 of timer K-1 transfer to their opposite poles. At the same time power is applied to the reset clutch of timer K-1 via common pole 1 and terminal 4 of a relay K-2 in the control box, thereby setting the timer to the running time set on the timer dial face on the control panel by the operator. Simultaneously power is applied via common pole 6 and terminal 8 of timer K-1 to terminals 7 and 6 of a relay K-3 in the control box. Common pole 8 of relay K-3 then closes to terminal 6 of relay K-3, locking relay K-3 to an "on" position with power supplied from a pole of the panel selector switch S-1. When the start pushbutton is released, common pole 11 of timer K-1 remains on terminal 12, common pole 4 remains on terminal 5, common pole 6 returns to terminal 7, and common pole 14 returns to terminal 10.

If, when the foregoing occurs, toggle switch S3 is in its "timer" position as shown in FIG. 8, power is applied to terminal 7 of relay K-2 via common pole 11 and terminal 12 of relay K-1. This causes common pole 1 of relay K-2 to transfer to terminal 3 of relay K-2, thereby opening the reset circuit and preventing the inadvertent reset of timer K-1. Simultaneously common pole 8 of relay K-2 transfers from terminal 5 to terminal 6 of relay K-2 and applies power to terminal 3 of switch S3. With S3 in its "timer" position, power passes through common pole 1 of switch S3 and through conductor 152 of remote cable 50 to the coil of relay K-4 and to the normally open pole at side 2 of relay K-7 in the machine.

Upon closing of relay K-4, power is applied to one side of high pressure switch 62 and to one side of the "outlet plugged" indicator lamp 85 on the control panel. Power passes through high pressure switch 62 to float switch 58, to pole 1 of relay K-6 and to the common pole at side 1 of relay K-7 at the machine via conductor 165. The normally closed pole of relay K-7 side 1 now supplies power to a dust collector fan motor 153. At the same time conductor 154 supplies power to the opposite side of the "outlet plugged" indicator lamp 85 and one side of the "pump wear" indicator lamp 84 on the control panel.

Terminal 4 of relay K-6 applies power to one common pole of slurry pump selector switch 156. If the selector switch is in its "up" position, front slurry pump 18 operates. If the selector switch is in its "down" position, rear pump 19 operates.

At this point power is also applied through float switch 58 to the common pole on water inlet solenoid switch 90, and to one side of water inlet low pressure switch 61. Power is also supplied via conductor 155 to the opposite side of "pump wear" indicator lamp 84 on the control panel. At the same time, power is applied via inlet low pressure switch 61 to the common pole of relay K-5 in the machine, and a conductor 157 powers one side of inlet low pressure lamp 83 on the control panel.

Simultaneously power is applied from terminal 12 of timer K-1 to terminal 6 of switch S3. With switch S3 in its "timer" position, power flows through its common pole 4 via conductor 158 of interconnect cable 50 to the coil of relay K-5 in the machine. Power is thereby applied, through the normally open pole of relay K-5 and conductor 159 of interconnect cable 50 and conductor 166 to common bus 122 of microswitch bank 100. Power is delivered to the various metering and other motors of the machine depending upon which microswitch plungers are depressed by the program plate.

Approximately one second before the end of a timed machine operating cycle, common pole 4 of relay K-1 transfers from terminal 5 to terminal 3 thereof, applying power to common pole 1 of relay K-3. Since K-3 is already energized, this results in power being applied through conductor 160 to terminals 7 and 8 of relay K-6 and the common terminal at side 2 of relay K-7. This begins the timing cycle of flushing time delay relay K-6. Simultaneously power is applied via terminal 8 of relay K-6 and terminal 5 of relay K-6 to the coil of relay K-7, thereby energizing relay K-7. With relay K-7 energized, power to dust collector fan motor 153 is cut off, whereby such motor does not run during the flushing cycle. Simultaneously, power is applied through normally open contact at side 1 of relay K-7 to the other common pole of the pump selector switch 156, causing both of slurry pumps 18, 19 to operate during the flushing cycle to speed up the removal of all remaining carrier and additives from receiving tank 12. The flushing indicator light on the control panel is simultaneously energized through conductor 161 of interconnect cable 50.

When relay K-2 is de-energized, common pole 8 thereof transfers from terminal 6 to terminal 5 thereby cutting off the original power to the coil of relay K-4. However, relay K-4 remains closed during the flushing cycle, being supplied coil power from the normally open pole at side 2 of relay K-7, which was activated at the beginning of the flushing cycle. Flushing indicator lamp 82 on the control panel remains illuminated and both slurry pumps continue to run throughout the flushing period, which is determined by the time set of time delay relay K-6. When this relay times out, all operations cease, and the machine is ready for another complete operating cycle.

REMOTE START

If it is desired to start the machine from a remote switch such as at a scale of a feedmill, a pair of wires must lead from the remote switch to the machine. The connections from this switch may be applied to conductors 167, 168 at any junction box in the interconnect cable lines, or if there are no junctions in such lines, to appropriate terminals at terminal strip 163 at the machine. For remote operation, panel selector switch S1 must be turned to its "AUTO" position.

CONTINUOUS RUN

If it is desired to operate the machine continuously, such as in a percentage-type feedmill operation, toggle switch S3 is turned to its right-hand position, and the timer dial set to zero. Switch S3 then bypasses the timer circuits. Starting and stopping of the machine is accomplished by interrupting the line power by means provided by the mill operator. Switch S1 on the control panel should be set to its "AUTO" position. If a flushing operation is desired at the end of a day's run, it may be obtained by applying power to the machine, turning switch S3 to its left-hand position, setting selector switch S1 to its "HAND" position, and pressing start button S2. A normal flushing cycle results.

OPERATION OF TIMER K-1

Timer K-1 is a clock-operated, four-pole, double-throw mechanism arranged to operate as an off delay device. It is unique in that two poles are magnetically operated and two poles are mechanically operated. Common poles 6 and 14 are carried on the armature of a simple relay. Common poles 4 and 11 are single pole double-throw microswitches, operated by an arm on a timing pointer at the end of a timing cycle. The mechanical arrangement is such that common pole 4 operates 0.5 percent of the total time scale before common pole 11 operates.

The timer is set by turning a second pointer and knob counterclockwise to the desired time interval. Application of power between terminals 1 and 2 activate the relay armature carrying common poles 6 and 14. An arm on this armature releases the first timing pointer from the O ring and such pointer is rotated counterclockwise by a hair spring until it is stopped by the second pointer. When this resetting action takes place, common poles 6 and 14 of K-1 transfer from poles 7 and 10 to poles 8 and 9. At the same time, common poles 11 and 4 transfer from poles 13 and 3 to poles 12 and 5. These latter two common poles remain at poles 12 and 5 until time-out is complete. However, when power is released from terminal 1, common poles 6 and 14 return to poles 7 and 10. At this point power applied to terminals 12 and 2 causes the motor to run. The motor carries the timing pointer clockwise until it strikes the microswitch lever. This lever operates the microswitches, causing first common pole 4 and then common pole 11 to operate, completing the cycle.

By modifying the control circuit slightly, the timer can be caused to stop timing whenever a condition arises which causes the metering system to stop metering. Timing will resume whenever the metering operation is restored. This action prevents delivering an inadequate amount of additives in any situation where the metering system operation is inoperative.

To make this modification, terminal 7 of relay K-2 is removed from terminal 12 of relay K-1 and connected to terminal 5 of relay K-1. Terminal 6 of switch S3 is removed from terminal 12 of relay K-1 and connected to terminal 5 of relay K-1. Terminal 5 of switch S3 is removed from terminal 13 of relay K-1 and is connected to terminal 3 of relay K-1. A new lead is connected from the common bus 122 of microswitch bank 100 to terminal 12 of relay K-1.

In the illustrated control circuit diagram, the four bin metering rod motors 22 are each capable of operating at three different preselected speeds through activation of one of three microswitch plungers associated with each of the four speed controls 126. However, the liquid-metering pump and motor units 40 illustrated are capable of only one preselected speed each. Nevertheless, speed controls similar to those used for the metering rod motors can be used if desired to give each liquid pump more than one operating speed. In the illustrated control, each liquid additive can be metered at one of two different speeds by the use of a spare pump (FIG. 8) for each liquid, which pump is wired into the microswitch bank only when it is desired to change speeds.

Having illustrated and described a preferred embodiment of our invention, it should be apparent that the same permits of modification in arrangement and detail. We claim as our invention all such modifications as come within the true spirit and scope of the following claims.

We claim:

1. In a multiple ingredient dispensing apparatus including plural ingredient supply means, an electric motor-driven metering means for metering ingredients from each supply means, and control means for controlling the operation of said metering means and thereby controlling the formulation of ingredients dispensed comprising:

remote control means connected in an electrical circuit to the various motors of said motor-driven metering means, said remote control means including multiple selector switch means including at least one for each said motor, a said selector switch means being operable to energize one of said motors independently of the other said motors, said multiple selector switch means including switch actuators arranged in a common bank, and multiple interchangeable pre-programmed plate-type formulating members selectively positionable over said common bank of actuators and including means cooperable with selected ones of said actuators to determine the actuation of preselected ones of said selector switch means and thereby operating certain ones of said motors to dispense a preselected formulation of said plural ingredients as determined by said plate-type formulating members.

2. A dispensing apparatus according to claim 1 including motor speed control means in said circuit for selectively operating at least certain ones of said motors at a plurality of different constant speeds to vary the proportions of ingredients dispensed, at least some of said multiple selector switch means being operable to select the speed of operation of said certain ones of said motor so that said plate-type formulating means controls the proportions of ingredients dispensed as well as the kinds of ingredients dispensed.

3. Apparatus according to claim 1 wherein each said selector switch means includes a plunger actuator means, said plunger means for all said selector switches projecting from a common bank of said switches and being in prearranged positions at said remote control means, each said preprogrammed formulating member including a rigid plate adapted to overlie said plunger means, said plate having openings therethrough at preselected positions corresponding to the positions of at least some of said plunger means, said openings being larger than their corresponding said plunger means, and plate-retaining means for maintaining said program plate in position overlying said plunger means under sufficient pressure to actuate preselected ones of said plunger means while others of said plunger means are in registration with said openings in said plate so as to remain in their unactuated extended positions.

4. Apparatus according to claim 3 wherein said remote control means comprises a box-like housing having a front face containing a master switch means, said common bank lying along a wall of said housing with said plunger means protruding therefrom, said plate-retaining means including a cover plate hinged to said housing and including clamping means for clamping said cover plate to said housing in overlying relationship to said plunger means.

5. Apparatus according to claim 1 wherein a magnetically operated electrical switch means in said circuit is associated with at least one of said metering means, means movable with operation of said one metering means periodically into operating association with said magnetically operated switch means in a manner so as periodically to either interrupt or move a magnetic field to operate said switch means, and wink light means at said remote control means operatively connected to said magnetically operated switch means in said circuit for monitoring the operation of said metering means, the period of operation of said magnetically operated switch means corresponding to the speed of operation of said metering means.

6. Apparatus according to claim 5 wherein at least one of said metering means meters a liquid ingredient, said liquid-metering means including a pump means, an intake line leading from a liquid supply to said pump means, and a discharge line leading from said pump means, said magnetically operated switch means being mounted adjacent a section of said discharge line, said movable means comprising a magnet mounted within said section, said section having a greater length than said magnet and a greater diameter than the maximum width dimension of said magnet so as to permit periodic movement of said magnet past said magnetic switch means and flow of liquid through said section upon pulsing of said pump means, said section being constricted at the opposite ends thereof to limit movement of said magnet.

7. Apparatus according to claim 6 wherein said discharge line is of generally circular cross section and said magnet is of generally noncircular cross section to promote the flow of liquid through said section past said magnet.

8. Apparatus according to claim 1 wherein at least one of said metering means meters a dry ingredient and includes a generally cylindrical metering rod rotatable about its longitudinal axis, monitoring means for monitoring the operation of said metering rod including monitor switch means positioned adjacent said rod, switch actuator means, and means on said rod for moving said actuator means to a position for actuating said switch at least once during each revolution of said rod, light means on said remote control means connected to said monitor switch means so that rotation of said rod effects a periodic winking of said light means with said period corresponding to the speed of rotation of said metering rod.

9. Apparatus according to claim 1 wherein at least one of said metering means meters a dry ingredient and includes a rotary metering means rotatable about its longitudinal axis, monitoring means for monitoring the operation of said rotary metering means including monitor switch means positioned adjacent said rotary metering means, switch actuator means, and means on said rotary metering means for moving said actuator means to a position for actuating said switch means at least once during each revolution of said rotary metering means, light means on said remote control means connected to said monitor switch means so that rotation of said rotary metering means effects a periodic winking of said light means with said period corresponding to the speed of rotation of said rotary metering means.

10. Apparatus according to claim 1 wherein there is at least one said metering means for metering a liquid ingredient, said liquid-metering means including a dispensing line and a pump means in said line, said line leading from a source of supply to a dispensing point, and viscosity control means for maintaining said liquid ingredient at a predetermined viscosity just upstream from said pump means so that operation of said pump means at a preselected speed meters and dispenses a predictable volume of said liquid.

11. Apparatus according to claim 10 wherein said viscosity control means includes a liquid-retaining receptacle, means for maintaining the liquid within said receptacle at a substantially constant temperature, and a section of said dispensing line passing through the liquid within said receptacle.

12. Apparatus according to claim 11 wherein said section comprises a coiled length of metal tubing having a high coefficient of heat transfer.

13. Apparatus according to claim 1 wherein said remote control means includes variable timer means selectively operable to time the interval of operation of said metering motors selected by said formulating member and thereby determine the length of a metering cycle.

14. Apparatus according to claim 13 wherein said remote control means includes a bank of lights each representing a different metering function of said apparatus controlled by said selector switches and being illuminated selectively as determined by the activated ones of said selector switches.

15. Apparatus according to claim 14 wherein said remote control means includes a second bank of lights representing the same metering functions of said apparatus as said first-mentioned bank, the lights of said second bank being wink lights illuminated only periodically during an operating cycle as determined by the activated ones of said selector switches and by the actual operation of the metering function represented by a light of said second bank.

16. Apparatus according to claim 13 wherein said control means includes master switch means for selectively conditioning said electrical circuit either for a timed operating cycle as determined by said timer means or for continuous operation.

17. Apparatus according to claim 15 wherein said control means includes master switch means for selectively conditioning said electrical circuit either for a timed operating cycle as determined by said timer means or for continuous operation.

18. Apparatus according to claim 1 wherein said control means includes speed control means in said circuit for operating at least certain ones of said metering motors at a plurality of different preselected constant speeds to vary selectively the metering rate of at least some of said metering means independently of the metering rate of others of said metering means, at least some of said selector switches being operably connected to said speed control means in a manner so as to select the speed of operation of a metering motor as well as to select the metering motor to be operated.

19. Apparatus according to claim 18 wherein at least one of said metering motors is operably connected to one of said speed control means, said one speed control means being selectively operable to operate said one metering motor at at least two different constant speeds, at least two different ones of said selector switches being operably connected to said one metering motor and to said one speed control means in a manner so that one of said two switches is operable when activated to operate said one motor at a first constant speed and so that the other of said two switches is operable when activated to operate said one motor at a second constant speed.

20. Apparatus according to claim 13 wherein said remote control means includes in addition to said selector switch means:

a variable timer means for determining the length of an operating cycle of the metering means selected for operation by said selector switches and cooperative formulating member, first monitoring means including a first series of lights in said circuit operable upon activation of selected ones of said selector switch means to indicate the ones of said metering means selected for operation, second monitoring means including a second series of lights operable upon the actual operation of said selected metering means to indicate by a periodic winking to indicate the actual operation of said selected metering means and the speed of operation thereof, third monitoring means including a third series of lights operable to indicate the condition of various other operating components of said apparatus, and master switch means selectively operable to condition said electrical circuit for operating said selected metering means either continuously or through a timed operating cycle as determined by said variable timer means.

21. Apparatus according to claim 20 wherein said plural ingredient supply means includes both liquid ingredient supply means and dry ingredient supply means and said metering means includes dry metering means for metering dry ingredients from said dry ingredient supply means and pump means for metering liquid ingredients from said liquid supply means, said apparatus having means including a liquid conduit with a liquid inlet section, an ingredient-receiving section downstream of said inlet section and a liquid outlet section and means for inducing a flow of liquid carrier through said conduit to carry dry and liquid ingredients metered into said flow to a point of use, said third series of lights of said third monitoring means including a first light operably connected to means at said inlet section to monitor flow of said liquid carrier through said inlet section, a second light operably connected to means at said receiving section to monitor flow of liquid carrier through said receiving section, a third light operably connected to means at said outlet section to monitor flow through said outlet section, and a fourth light operably connected to means at said dry ingredient supply means for monitoring the level of dry ingredients in said supply means.

22. Apparatus according to claim 21 wherein said third monitoring means includes a fifth light for monitoring a metering segment of an operating cycle and a sixth light for monitoring a flush segment of an operating cycle wherein liquid carrier flows through said conduit following discontinuance of metering.

23. In a machine for metering and dispensing multiple micro-ingredient concentrates into a liquid carrier for use in the formulation of livestock or poultry feed in a feed mill, multiple container for storing separately quantities of different micro-ingredient concentrates, a separate metering means for metering concentrates from each said container including a separate metering motor for each said metering means, a conduit for receiving concentrates dispensed by said metering means, flow-inducing means for inducing a flow of liquid carrier through said conduit to carry said concentrates to said feed mill, and control means for controlling the operation of said machine comprising:

multiple selector switch means operable when selectively actuated to determine the operation of said metering means and thus the formulation of micro-ingredients dispensed, variable timer means operable to determine the length of an operating cycle of said metering means selected by said selector switch means, and means automatically operable at the end of an operating cycle to provide a flush cycle through continued operation of said flow-inducing means for a predetermined length of time following discontinuance of metering.

24. A machine according to claim 23 wherein said control means includes means operable to de-energize the selected ones of said metering motors when said variable timer has timed out.

25. A machine according to claim 23 wherein said control means includes means for resetting said variable timer means to a starting condition upon completion of an operating cycle.

* * * * *